United States Patent
Park et al.

(10) Patent No.: US 10,209,407 B2
(45) Date of Patent: Feb. 19, 2019

(54) OPTICAL FILM INCLUDING FUNCTIONAL COATING LAYER, AND POLARIZING PLATE AND IMAGE DISPLAY APPARATUS INCLUDING THE SAME

(71) Applicant: LG CHEM, LTD., Seoul (KR)

(72) Inventors: Jun-Wuk Park, Daejeon (KR); Yi-Rang Lim, Daejeon (KR); Nam-Jeong Lee, Daejeon (KR); Hwa-Sub Shim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/961,648

(22) Filed: Aug. 7, 2013

(65) Prior Publication Data

US 2014/0037942 A1 Feb. 6, 2014

Related U.S. Application Data

(63) Continuation of application No. PCT/KR2013/003498, filed on Apr. 24, 2013.

(30) Foreign Application Priority Data

May 31, 2012 (KR) .................. 10-2012-0058766
Apr. 15, 2013 (KR) .................. 10-2013-0041005

(51) Int. Cl.
*G02B 1/11* (2015.01)
*G02B 1/111* (2015.01)
*G02B 27/00* (2006.01)
*C08J 7/04* (2006.01)

(52) U.S. Cl.
CPC ............ *G02B 1/111* (2013.01); *C08J 7/047* (2013.01); *G02B 27/0006* (2013.01); *C08J 2333/12* (2013.01); *C08J 2433/00* (2013.01); *C08J 2475/04* (2013.01); *Y10T 428/259* (2015.01); *Y10T 428/2993* (2015.01); *Y10T 428/31935* (2015.04)

(58) Field of Classification Search
CPC .......... Y10T 428/259; Y10T 428/2993; Y10T 428/31935; G02B 27/0006; G02B 1/111
USPC ........................................ 428/331
See application file for complete search history.

(56) References Cited

U.S. PATENT DOCUMENTS

| | | | |
|---|---|---|---|
| 6,458,467 B1 * | 10/2002 | Mizuno et al. | 428/480 |
| 7,848,021 B2 | 12/2010 | Asakura et al. | |
| 8,114,499 B2 | 2/2012 | Hsu et al. | |
| 8,344,083 B2 | 1/2013 | Um et al. | |
| 2003/0004278 A1 | 1/2003 | Asano et al. | |
| 2005/0277729 A1 * | 12/2005 | Tsunemine et al. | 524/558 |
| 2008/0145572 A1 * | 6/2008 | Yano et al. | 428/1.54 |
| 2011/0157525 A1 | 6/2011 | Yamasaki et al. | |

FOREIGN PATENT DOCUMENTS

| | | |
|---|---|---|
| CN | 102112899 A | 6/2011 |
| JP | 2000-230016 A | 8/2000 |
| JP | 2000229395 A | 8/2000 |
| JP | 2001-151814 A | 6/2001 |
| JP | 2002-120326 A | 4/2002 |
| JP | 2004-004777 A | 1/2004 |
| JP | 2006-272678 A | 10/2006 |
| JP | 2006272676 A | 10/2006 |
| JP | 2007-249191 A | 9/2007 |
| JP | 2010055062 A | 3/2010 |
| JP | 2010137555 A | 6/2010 |
| JP | 2011-209676 A | 10/2011 |
| JP | 2012032768 A | 2/2012 |
| KR | 10-2008-0108059 A | 12/2008 |
| KR | 1020090026860 A | 3/2009 |
| KR | 10-2009-0115040 A | 11/2009 |
| KR | 10-2012-0024211 A | 3/2012 |

* cited by examiner

*Primary Examiner* — Samir Shah
(74) *Attorney, Agent, or Firm* — Dentons US LLP

(57) ABSTRACT

There is provided an optical film including an acrylic film, and a functional coating layer formed on at least one side of the acrylic film. The functional coating layer includes a water-dispersible resin and at least two kinds of fine particles having different average particle sizes.

6 Claims, No Drawings

OPTICAL FILM INCLUDING FUNCTIONAL COATING LAYER, AND POLARIZING PLATE AND IMAGE DISPLAY APPARATUS INCLUDING THE SAME

This application is a Continuation Bypass Application of International Patent Application No. PCT/KR2013/003498, filed Apr. 24, 2013, and claims the benefit of Korean Patent Application Nos. 10-2012-0058766 filed on May 31, 2012, and 10-2013-0041005 filed on Apr. 15, 2013, in the Korean Intellectual Property Office, the disclosures of which are incorporated herein by reference.

BACKGROUND OF THE INVENTION

Field of the Invention

The present invention relates to an optical film including an acrylic film and a functional coating layer, formed of a water-dispersible resin and at least two kinds of fine particles having different sizes, and a polarizing plate and an image display apparatus including the optical film.

Description of the Related Art

In the related art, a general polarizing plate has a stacked structure formed by coating both sides of a polyvinyl alcohol (PVA) polarizer with triacetyl cellulose (TAC) films.

However, TAC films are vulnerable to moisture and thus may be deformed if used for a long period of time. For this reason, there have been attempts to manufacture polarizing plates using films formed of cyclic olefin resins or acrylic resins that are resistant to moisture and have low phase differences. Particularly, acrylic films may be advantageous in terms of cost as well as optical characteristics and durability.

In the related art, however, acrylic films are only formed of an acryl resin and have a relatively large amount of surface friction. Thus, it is difficult to roll up such acrylic films due to a blocking phenomenon (film surfaces stick together in a roll).

To address this problem, methods of forming films using an acrylic resin mixed with rubber particles or organic particles have been proposed. In this case, however, films may have a high degree of haze because light may be scattered by such particles, and are difficult to stretch.

SUMMARY OF THE INVENTION

An aspect of the present invention is to provide an optical film formed by coating a side of an acrylic film with a functional coating layer having a low coefficient of friction. The transparency of the optical film is not lowered by the functional coating layer, and the optical film can be smoothly carried and rolled up without a blocking phenomenon. Other aspects of the present invention are to provide a polarizing plate including the optical film and an image display apparatus including the optical film.

According to an aspect of the present invention, there is provided an optical film including: an acrylic film; and a functional coating layer formed on at least one side of the acrylic film. The functional coating layer includes a water-dispersible resin and at least two kinds of fine particles having different average particle sizes.

According to other aspects of the present invention, there are provided a polarizing plate including the optical film and an image display apparatus including the optical film.

DETAILED DESCRIPTION OF THE INVENTION

Hereinafter, embodiments of the present invention will be described in detail. However, the present invention may be embodied in many different forms and should not be construed as being limited to the embodiments set forth herein. These embodiments are provided so that those skilled in the art to which the present invention pertains thoroughly understand the present invention.

The inventers have conducted research into developing thin acrylic optical films able to prevent a blocking phenomenon (anti-blocking characteristics), and found that an optical film having good optical properties, stretchability, formability to be formed to have a slim shape, and anti-blocking characteristics could be manufactured by coating an acrylic film with a functional coating layer including at least two kinds of fine particles having different average particle sizes.

According to the embodiments of the invention, an optical film includes: an acrylic film; and a functional coating layer formed on at least one side of the acrylic film. The functional coating layer includes a water-dispersible resin and at least two kinds of fine particles having different average particle sizes.

The present invention is characterized by the at least two kinds of fine particles having different average particle sizes. Owing to the at least two kinds of fine particles having different average particle sizes, the surface of the functional coating layer can be sufficiently uneven to effectively reduce the friction between the acrylic film and the functional coating layer, and/or the friction between surfaces of the functional coating layer. Therefore, the optical film can have good anti-blocking characteristics.

In detail, as the size of the fine particles increases, the surface of the functional coating layer becomes more uneven. This improves the anti-blocking characteristics of the functional coating layer and decreases the coefficient of friction of the functional coating layer. However, as the size of the fine particles increases, the haze of the functional coating layer increases. Therefore, the size of the fine particles may be adjusted to be within an appropriate range.

In the embodiments of the present invention, the at least two kinds of fine particles have different average particle sizes, and thus, relatively small fine particles may properly be mixed between relatively large fine particles to reduce the haze and coefficient of friction of the functional coating layer and to improve the anti-blocking characteristics of the functional coating layer.

As described above, the surface of the functional coating layer becomes more uneven as the size of the fine particles increases, and the thickness of the functional coating layer is usually from 50 nm to 2000 nm. Therefore, it may be preferable that the size of the fine particles be from 151 nm to 400 nm to obtain the above-described effects. In this case, a mixture of at least two kinds of fine particles having different average particle sizes in the range of 20 nm to 150 nm may be more effective than fine particles having a uniform particle size.

For example, it may be preferable that the at least two kinds of fine particles comprise: first fine particles having an average particle size of 20 nm to 150 nm; and second fine particles having an average particle size of 151 nm to 400 nm. The difference in average size between the first and second fine particles may be from 50 nm to 380 nm. In another example, it may be preferable that the at least two kinds of fine particles include: first fine particles having an average particle size of 50 nm to 150 nm; and second fine particles having an average particle size of 200 nm to 350 nm. In this case, the difference in average size between the first and second fine particles may be from 50 nm to 300 nm Fine particles having an average particle size of less than 20 nm are substantially not effective to make the surface of the functional coating layer uneven. Fine particles having an average particle size of greater than 400 nm may markedly scatter visible light and thus may not suitable for an optical film. Furthermore, if the difference of the average particle sizes of two kinds of fine particles is less than 50 nm, the particle size distributions of the two kinds of fine particles are generally overlapped with each other, and thus it may be difficult to obtain the effects of using two kinds of fine particles.

It may be preferable that the weight ratio of the first fine particles to the second fine particles be within the range of 20/80 to 80/20, more preferably, within the range of 30/70 to 70/30. If the weight ratio is outside the range, the unevenness of the functional coating layer may be similar to the unevenness of a functional coating layer including fine particles having a uniform particle size. That is, it may be difficult to obtain the effects of decreasing the haze and coefficient of friction of the functional coating layer and improving the anti-blocking characteristics of the functional coating layer.

In the embodiments of the invention, the fine particles may be any appropriate fine particles. For example, the fine particles may be water-dispersible fine particles. For example, the fine particles may include inorganic fine particles and/or organic fine particles. Examples of the inorganic fine particles may include fine particles of inorganic oxides such as silica, titania, alumina, zirconia, zinc oxide, and antimony oxide. Examples of the organic fine particles may include fine particles of resins such as silicon resins, fluorine resins, (meth)acrylic resins, crosslinked polyvinyl alcohols, and melamine resins.

For example, the fine particles may be silica fine particles. Silica is transparent to cause less haze, difficult to color, and effective to improve the anti-blocking characteristics of the functional coating layer. Therefore, silica has substantially no effect on the optical properties of the acrylic film. In addition, silica can be stably dispersed in materials of the functional coating layer, and when the functional coating layer is formed, silica makes the formation process easier. Specifically, the silica may be colloidal silica. Commercially available colloidal silica products known in the art to which the present invention may be used. Examples of commercially available silica products may include: SNOWTEX series by Nissan chemical industries, Ltd., AEROSIL series by Airproducts, EPOSTAR series and SOLIOSTAR RA series by Nihon Catalyst Co., and LSH series by Ranco.

The present invention is characterized in that the functional coating layer includes a water-dispersible resin. Since the functional coating layer includes a water-dispersible resin instead of a solvent-dispersible resin, the acrylic film vulnerable to solvents may not be eroded and deteriorated in mechanical properties and surface quality by erosion, and thus the acrylic film may uniformly coated with the functional coating layer. In addition, since the water-dispersible resin does not require equipment for preventing explosions, the optical film can be formed through in-line processes.

Non-limiting examples of the water-dispersible resin may include water-dispersible polyurethane resins, water-dispersible acrylic resins, and combinations thereof.

A polyurethane resin that can be used as the water-dispersible resin may have a weight average molecular weight of 10,000 to 1,000,000. If the weight average molecular weight of the polyurethane resin is less than 10,000, the adhesive strength of the polyurethane resin is too low, and if the weight average molecular weight of the polyurethane resin is greater than 1,000,000, it is difficult to disperse the polyurethane resin in water.

The polyurethane resin may include a carboxyl group. In this case, when the polyurethane resin is prepared, anions are generated to facilitate dispersion of the polyurethane resin in water and to bring the polyurethane resin into close contact with a polarizer.

The polyurethane resin including a carboxyl group may be obtained through a reaction among polyol, polyisocyanate, and a chain extender having a free carboxyl group. Examples of the chain extender having a carboxyl group may include dihydroxy carboxylic acid and dihydroxy succinic acid. The dihydroxy carboxylic acid may be dialkylol alkanoic acid including dimethylol alkanoic acid. For example, the dimethylol alkanoic acid may be dimethylol acetic acid, dimethylol butanoic acid, dimethylol propionic acid, dimethylol butyric acid, and dimethylol pentanoic acid. The listed examples may be used alone or in combination.

In another example, the polyurethane resin may be obtained by a reaction between a polyol and polyisocyanate. The polyol may be any kind of polyol including at least two hydroxyl groups per molecule. Examples of the polyol may include polyester polyol, polycarbonate diol, and polyether polyol. The polyol may be at least one selected from the listed materials. That is, the polyol may be one or a combination of the listed materials.

The polyester polyol may be obtained by a reaction between a poly basic acid and a polyol. Examples of the poly basic acid may include: aromatic dicarboxylic acids such as ortho-phthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid; aliphatic decarboxylic acids such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; alicyclic dicarboxylic acids such as hexahydrophthalic acid, tetrahydrophthalic acid, 1,3-cyclohexanedicarboxylic acid, and 1,4-cyclohexanedicarboxylic acid; and reactive derivatives such as acid anhydrides thereof, alkyl ester, and acid halide. The listed examples of the poly basic acid may be used alone or in combinations thereof.

The polyol may be at least one selected from the group consisting of ethyleneglycol, 1,2-propanonediol, 1,3-propanediol, 1,3-butanediol, 1,4-butanediol, neopentylglycol, pentanediol, 1,6-hexanediol, 1,8-octanediol, 1,10-decanediol, 4,4'-dihydroxyphenylpropane, 4,4'-dihydroxylmethylmetane, diethyleneglycol, triethyleneglycol, polyethyleneglycol, dipropyleneglycol, polypropyleneglycol, 1,4-cyclohexanedimethanol, 1,4-cycylohexanediol, bisphenol A, bisphenol F, glycerin, 1,1,1-trimethylolpropane, 1,2,5-hexatriol, pentaerythritol, glucose, sucrose, and sorbitol.

The polycarbonate diol may be aliphatic polycarbonate diol. If the polyurethane resin is prepared using aliphatic polycarbonate diol, the polyurethane resin has good mechanical properties, water resistance, oil resistance, and particularly good long-term weather resistance. The aliphatic polycarbonate diol may be at least one selected from the group consisting of poly(hexamethylene carbonate)glycol and poly(cyclohexane carbonate)glycol. However, the aliphatic polycarbonate diol is not limited thereto.

The polyether polyol may be obtained by adding alkyl oxide to polyhydric alcohol through ring-opening polymerization. Examples of the polyhydric alcohol may include ethyleneglycol, diethyleneglycol, propyleneglycol, dipropylenegylcol, glycerin, and trimethylolpropane. The listed examples may be used alone or in combination.

The polyisocyanate may be any compound including two or more NCO groups. For example, the polyisocyanate may be one selected from the group consisting of tolylene diisocyanate (TDI), 4,4-diphenylmethane diisocyanate (MDI), 1,5-naphthalene diisocyanate (NDI), tolydine diisocyanate (TODI), hexamethylenediisocyanate (HMDI), isophorone diisocyanate (IPDI), p-phenylene diisocyanate, 1,4-diisocyanate, and xylene diisocyanate (XDI), and combinations thereof.

The polyurethane resin may be prepared by any method known in the art to which the present invention pertains. For example, the polyurethane resin may be prepared by a one-shot method in which components react with each other at once or a multistep method in which components react with each other step by step. If the polyurethane resin includes a carboxyl group, the polyurethane resin may be prepared by a multistep method to easily introduce the carboxyl group. An appropriate urethane reaction catalyst may be used when the polyurethane resin is prepared.

In addition to the above-mentioned components, another polyol and/or another chain extender may be used when the polyurethane resin is prepared.

For example, the other polyol may be a polyol having three hydroxyl groups, such as sorbitol, glycerin, trimethylolethane, trimethylolpropane, and pentaerythritol.

Examples of the other chain extender may include: glycols such as ethyleneglycol, diethyleneglycol, triethyleneglycol, 1,3-propanediol, 1,3-butanediol, 1,4-butanediol, neopentylglycol, pentanediol, 1,6-hexanediol, and propyleneglycol; aliphatic diamines such as ethylenediamine, propylenediamine, hexamethylenediamine, 1,4-butanediamine, and aminoethylethanolamine; alicyclic diamines such as isophoronediamine and 4,4-dicyclohexylmethanediamine; and aromatic diamines such as xylenediamine and tolylenediamine.

In addition, a neutralizing agent may be used when the polyurethane resin is prepared. The neutralizing agent may improve the stability of the polyurethane resin in water. Examples of the neutralizing agent may include ammonia, N-methylmorpholine, triethylamine, dimethylethanolamine, methyldiethanolamine, triethanolalkyne, morpholine, tripropylamine, ethanolamine, and tri-isopropanolamine. The listed examples may be used alone or in combinations thereof.

The polyurethane resin may be prepared by using an organic solvent that does not react with the polyisocyanate but can dissolve in water. Examples of the organic solvent may include: ester solvents such as ethyl acetate and ethyl cellosolve acetate; ketone solvents such as acetone, methylethylketone, and methylisobutylketone; and ether solvents such as dioxane tetrahydrofuran. The listed examples may be used alone or in combination.

A water-dispersible acrylic resin that can be used as the water-dispersible resin for the functional coating layer may be formed by polymerizing acrylic monomers. The acrylic monomers may have a glass transition temperature higher than room temperature. Non-limiting examples of the acrylic monomers may include methyl methacrylate, ethyl methacrylate, isobutyl methacrylate, and mixtures thereof.

The water-dispersible resin may further include at least one acrylic monomer having a glass transition temperature lower than room temperature. In the case, the adhesive strength and other properties of the functional coating layer may be improved. For example, the water-dispersible resin may further include methoxy ethylamino acrylate, butyl acrylate, hexyl acrylate, ethylhexyl acrylate, or combinations thereof. However, the water-dispersible resin is not limited thereto.

The water-dispersible resin may further include at least one water-soluble acrylic monomer. Owing to the water-soluble acrylic monomer, the acrylic monomers may be stably stored. Non-limiting examples of the water-soluble acrylic monomer include hydroxyhexyl acrylate, hycroxyethyl acrylamid, methacrylic acid, and combinations thereof.

In the embodiments of the invention, the functional coating layer may include 0.5 to 20 parts by weight of the fine particles for every 100 parts by weight of the water-dispersible resin. In another embodiment, the functional coating layer may include 0.5 to 10 parts by weight of the fine particles for every 100 parts by weight of the water-dispersible resin. If the functional coating layer includes less than 0.5 parts by weight of the fine particles for every 100 parts by weight of the water-dispersible resin, the optical film may not slip smoothly when being rolled up to cause winding errors or fracture of the optical film. On the other hand, if the functional coating layer includes more than 20 parts by weight of the fine particles for every 100 parts by weight of the water-dispersible resin, the degree of haze of the optical film may increase. That is, it may be difficult to form a transparent optical film having a haze level of 0.3 or less.

In the embodiments of the invention, as described above, the optical film includes an acrylic film as a base film. The acrylic film may be formed of a material including a (meth)acrylate resin as a main component through an extrusion process.

In the embodiments of the invention, a resin including an acrylate unit and/or a methacrylate unit is included as a main component in the (meth)acrylate resin. In other words, the term "(meth)acrylate resin" includes: a homopolymer resin including an acrylate unit or a methacrylate unit; a copolymer resin in which an acrylate unit and/or a methacrylate unit and one or more other monomers are copolymerized; and a blend resin including a (meth)acrylate resin.

In the embodiments of the present invention, non-limiting examples of the (meth)acrylate resin may include: a copolymer resin including an alkyl(meth)acrylate unit and an N-cycloalkyl maleimide unit; a copolymer resin including an alkyl(meth)acrylate unit and a styrene unit; and a copolymer resin including an alkyl(meth)acrylate unit, an N-cycloalkyl maleimide unit, and a styrene unit. In addition, the (meth)acrylate resin may be a blend resin including such a copolymer resin and an aromatic resin having a carbonate moiety in a backbone thereof.

The alkyl(meth)acrylate unit is a term including an alkylacrylate unit and an alkylmethacrylate unit. The alkyl(meth)acrylate unit may have an alkyl group having a carbon number of 1 to 10, preferably, 1 to 4. The N-cycloalkyl maleimide unit may have an N-cycloalkyl group having a carbon number of 4 to 12, preferably, 5 to 8. In an non-limiting example, the styrene unit may include at least one selected from the group consisting of styrene, α-methyl styrene, 3-methyl styrene, 4-methyl styrene, 2,4-dimethyl styrene, 2,5-dimethyl styrene, 2-methyl-4-chlorostyrene, 2,4,6-trimethyl styrene, cis-β-methyl styrene, trans-β-methyl styrene, 4-methyl-α-methyl styrene, 4-fluoro-α-methyl styrene, 4-chloro-α-methyl styrene, 4-bromo-α-methyl styrene, 4-t-butyl styrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene. For example, the styrene unit may include at one of styrene and α-methyl styrene.

The (meth)acrylate resin may have a lactone ring structure. Examples of (meth)acrylate resins having a lactone ring structure are disclosed in Japanese Patent Application Laid-open Publication Nos. 2000-230016, 2001-151814, and 2002-120326.

The (meth)acrylate resin may have an aromatic ring, and an example thereof is disclosed in Korean Patent Application Laid-open No. 10-2009-0115040. The disclosed (meth) acrylate resin includes: (a) a (meth)acrylate unit including at least one (meth)acrylate derivative; (b) an aromatic unit including a chain having a hydroxyl-containing moiety and an aromatic moiety; (c) a styrene unit including at least one styrene derivative; and (d) a ring unit including a ring moiety. The units (a) to (d) may be included in the (meth) acrylate resin as separate copolymers, or two or more of the units (a) to (d) may be included in the (meth)acrylate resin as a copolymer.

For example, the (meth)acrylate resin may include a copolymer having a methyl(meth)acrylate as the unit (a) and an N-cyclohexyl maleimide as the unit (b). That is, the (meth)acrylate resin may include poly(N-cyclohexyl maleimide-co-methyl(meth)acrylate). In another example, the (meth)acrylate resin may include a copolymer having styrene as the unit (c) and maleic anhydride as the unit (d). In example, the (meth)acrylate resin may include a copolymer having: methylmethacrylate as the unit (a), styrene and α-methyl styrene as the unit (c), and N-cyclohexyl maleimide as the unit (d). In another example, the (meth)acrylate resin may include a copolymer having: methylmethacrylate as the unit (a), styrene and α-methyl styrene as the unit (c), and N-cyclohexyl maleimide and maleic anhydride as the unit (d). These are examples of the present invention, and the present invention is not limited thereto.

The acrylic film may be formed by any method. For example, materials such as a (meth)acrylate resin, a polymer, and an additive may be fully mixed by an appropriate method to form a thermoplastic resin composition, and a film may be formed of the thermoplastic resin composition. In another example, solutions such as a (meth)acrylate resin solution, a polymer solution, and an additive solution may be individually prepared and mixed with each other to obtain a uniform solution mixture, and a film may be formed using the uniform solution mixture.

The thermoplastic resin composition may be obtained by: pre-blending the above-described raw materials using an appropriate mixer such as an omni-mixer; and kneading and extruding the mixture. The mixture may be kneaded and extruded by any mixer. For example, a uniaxial extruder, a biaxial extruder, or a pressure kneader may be used.

Examples of film forming methods include: a solution casting method, a melting extrusion method, a calendaring method, and a compressing method. In some cases, the melting extrusion method may have some merits.

The melting extrusion method may be any method known in the art to which the present invention pertains, such as a T-die method and an inflation method. At this time, films may be formed in the temperature range of 150° C. to 350° C. For example, films may be formed in the temperature range of 200° C. to 300° C.

In the case of forming a film using the T-die method, a T-die may be disposed on a leading end of a uniaxial or biaxial extruder to roll up an extruded film. In this case, when a film is extruded and rolled, the film may be stretched (oriented) in the extrusion direction using a stretching roll at an appropriate temperature (uniaxial stretching). Simultaneously or sequentially, the film may also be stretched (oriented) in a direction perpendicular to the extrusion direction by using a transversal extruder such as a stenter.

The acrylic film may be a non-oriented film or an oriented film. In the latter case, the acrylic film may be a uniaxially oriented film or a biaxially oriented film. If the acrylic film is a biaxially oriented film, the acrylic film may simultaneously oriented in biaxial directions or sequentially oriented in biaxial directions. If the acrylic film is a biaxially oriented film, the quality of the acrylic film can be improved owing to improved mechanical strength.

If another thermoplastic resin is added to the acrylic film, the phase difference of the acrylic film may be suppressed when the acrylic film is oriented, and thus the isotropy of the acrylic film may be maintained. On the other hand, if a phase difference adjusting agent having a great degree of anisotropy is added to the acrylic film, the phase difference of the acrylic film may be markedly increased when the acrylic film is oriented, and thus the acrylic film may be used as an compensation film for obtaining a wide viewing angle.

In the embodiments of the invention, the optical film may be manufactured by coating the acrylic film with a functional coating layer and drying the coated acrylic film. At this time, a coating method known in the art to which the present invention pertains may be used. For example, a bar, gravure, or slot-die coating method may be used.

A surface treatment may be performed on at least one side of the acrylic film to increase the adhesive strength between the acrylic film and the functional coating layer. The surface treatment may be performed by any method known in the art to which the present invention pertains. For example, a corona or plasma treatment method may be used.

In addition, the drying process of the optical film may be performed using a convection oven. Preferably, the drying process may be formed within a temperature range of 90° C. to 120° C. for 10 seconds to 5 minutes. However, the present invention is not limited thereto. The drying temperature may be varied according to the progress of the drying process.

In detail, if the optical film is a non-oriented film or a film oriented before the coating process, the drying process may be performed at a temperature lower than the glass transition temperature (Tg) of the optical film.

On the other hand, if orientation of the optical film is intended after the coating process, the optical film may be dried at a temperature of 90° C. to 120° C. for 10 seconds to 3 minutes after the coating process, and then the optical film may be oriented. Optionally, the optical film may simultaneously be oriented and dried at an orientation temperature.

In the case of simultaneous orientation and drying, it may be preferable that the orientation temperature be within the range of Tg to (Tg+30° C.) where Tg is the glass transition temperature of the acrylic resin composition. More preferably, the orientation temperature may be within the range of (Tg+2° C.) to (Tg+20° C.). If the orientation temperature is lower than Tg, the optical film may be fractured when being oriented. On the other hand, of the orientation temperature is greater than (Tg+30° C.), the resin composition of the optical film may flow, and it may be difficult to stably orient the optical film.

In the embodiments of the invention, The thickness of the functional coating layer be within the range of 50 nm to 2000 nm, preferably, 100 nm to 1000 nm, more preferably, 200 nm to 700 nm. If the thickness of the functional coating layer is less than 50 nm, sufficient adhesive strength may not be obtained. On the other hand, if the thickness of the functional coating layer is greater than 2000 nm, the functional coating layer may be insufficiently dried, or sufficient slippage characteristics of the functional coating layer may not be obtained because the water-dispersible fine particles of the functional coating layer are not exposed to the outside.

In the embodiments of the invention, the optical film may have a surface friction coefficient of 0.6 or less. In this case, good slippage characteristics may be obtained to prevent wrinkles on a rolled film and other winding errors such as blocking.

In the embodiments of the invention, it may be preferable that the optical film have an internal haze of 0.5% or less. The fine particles included in the optical film scatter light to cause the internal haze of the optical film. As the internal haze of the optical film increases, the light transmittance of a polarizing plate coated with the optical film may be decreased. If an optical film having a great internal haze value is used for an LCD panel, the contrast ratio of the LCD panel may be decreased. Therefore, in the embodiments of the present invention, it may be preferable that the internal haze of the optical film be 0.5% or less, more preferably, 0.3% or less.

In addition, the present invention provides polarizing plates including the above-described optical film. If the optical film of the embodiments of the invention is used for optical parts such as polarizing plates, the light transmittance of such an optical part is not lowered owing to the high light transmittance of the functional coating layer of the optical film, and the slippage characteristics of the optical part is improved because the surface of the optical film is appropriately uneven owing the water-dispersible fine particles included in the functional coating layer.

Furthermore, the present invention provides various electronic apparatuses such as image display apparatuses including the above-described optical film or polarizing plate. The electronic apparatuses may be any electronic apparatuses. For example, the electronic apparatuses may be image display apparatuses such as LCDs and PDPs. The electronic apparatuses may have structures known in the related art except that the electronic apparatuses include the optical film and the functional coating layer of the present invention.

The present invention will now be described in more detail with reference to examples.

EXAMPLE 1

A non-oriented acrylic film having a width of 800 mm was formed of a poly(cyclohexyl maleimide-co-methylmethacrylate) resin (PMMA830HR manufactured by LGMMA Corporation) under process conditions of 250° C. and 250 rpm by using a T-die film forming machine. Then, the acrylic film was oriented at 135° C. in an MD direction by a factor of 1.8.

A functional coating liquid was prepared by mixing: 31.75 g of a water-dispersible polyurethane resin (aliphatic polycarbonate diol type CK-PUD-PF: an aqueous solution having a solid content of 30%, manufactured by Chokwang Paint Corporation); 1.19 g of first colloidal silica (an aqueous solution having an average particle size of 70 nm and a solid content of 20%); 1.19 g of second colloidal silica (an aqueous solution having an average particle size of 200 nm and a solid content of 20%); and 65.87 g of pure water.

The acrylic film oriented in the MD direction was corona-treated at 50 W/m²/min. Then, the acrylic film was coated with the functional coating liquid by using Mayer bar #3 and was dried with 90° C. wind for 3 minutes. Thereafter, the acrylic film was oriented at 135° C. in a TD direction by a factor of 2.4 so as to form an optical film (having a thickness of 50 μm) including a functional coating layer having a thickness of 300 nm.

EXAMPLE 2

An optical film including a functional coating layer was formed in the same manner as Example 1 except that a functional coating liquid was prepared by mixing: 31.75 g of a water-dispersible polyurethane resin (aliphatic polycarbonate diol type CK-PUD-PF: an aqueous solution having a solid content of 30%, manufactured by Chokwang Paint Corporation); 0.71 g of first colloidal silica (an aqueous solution having an average particle size of 100 nm and a solid content of 20%); 1.67 g of second colloidal silica (an aqueous solution having an average particle size of 300 nm and a solid content of 20%); and 65.87 g of pure water.

EXAMPLE 3

An optical film including a functional coating layer was formed in the same manner as Example 1 except that a functional coating liquid was prepared by mixing: 31.15 g of a water-dispersible polyurethane resin (aliphatic polycarbonate diol type CK-PUD-PF: an aqueous solution having a solid content of 30%, manufactured by Chokwang Paint Corporation); 2.34 g of first colloidal silica (an aqueous solution having an average particle size of 70 nm and a solid content of 20%); 0.93 g of second colloidal silica (an aqueous solution having an average particle size of 300 nm and a solid content of 20%); and 65.58 g of pure water.

COMPARATIVE EXAMPLE 1

An optical film including a functional coating layer was formed in the same manner as Example 1 except that a functional coating liquid was prepared by mixing: 31.15 g of a water-dispersible polyurethane resin (aliphatic polycarbonate diol type CK-PUD-PF: an aqueous solution having a solid content of 30%, manufactured by Chokwang Paint Corporation); 3.27 g of colloidal silica having an average particle size of 300 nm (an aqueous solution having a solid content of 20%); and 65.58 g of pure water.

COMPARATIVE EXAMPLE 2

An optical film having a functional coating layer was formed in the same manner as Comparative Example 1 except that colloidal silica having an average particle size of 50 nm was used.

EXPERIMENTAL EXAMPLE

1. Internal Haze

Sides of the optical films coated with the functional coating layers were coated with a PVA adhesive (Gohsefimerz-200, 4% solution, manufactured by Nippon Synthetic Chemical Industry Co., Ltd.) by using Mayer bar #9, and the optical films were dried in an oven at 90° C. for 5 minutes. Thereafter, the internal haze of the optical films was measured using a haze meter (Murakami, HM-150). The results of the measurement are shown in Table 1 below.

2. Coefficient of Static Friction

According to Test Standard ASTM D 1894, the sides of the optical films coated with the functional coating layers and the other sides of the protective films were measured in frictional force to calculate coefficients of static friction thereof. The measurement was performed using a 500-g weight at a rate of 180 mm/min. The results of the measurement are shown in Table 1 below.

3. Anti-Blocking

Both ends of the optical films prepared in Examples 1 to 3 and Comparative Examples 1 and 2 were slit, and 500 m or more of each optical film was rolled up as a film roll. The rolled states of the optical films were observed with the naked eye, and after one week, the external appearances thereof were observed with the naked eye. Then, anti-blocking characteristics thereof were evaluated. The evaluation results are shown in Table 1 below.

◯ (good): no wrinkles were observed on the rolled-up film, and after one week, no change in external appearance and no blocking phenomenon was observed.

X (poor): wrinkles were formed during rolling-up, or after one week, the external appearance changed or film surfaces stuck together.

TABLE 1

| | | Functional coating composition (after drying) | | | | | | | |
|---|---|---|---|---|---|---|---|---|---|
| | | Content of water-dispersible polyurethane resin (parts by weight) | First fine particles | | Second fine particles | | Measurements | | |
| | Base Film | | Average particle size (nm) | Content (parts by weight) | Average particle size (nm) | Content (parts by weight) | Internal haze (%) | Coefficient of static friction | Anti-blocking |
| *E1 | Oriented acrylic film | 100 | 70 | 2.5 | 200 | 2.5 | 0.2 | 0.45 | ◯ |
| E2 | | | 100 | 1.5 | 300 | 3.5 | 0.3 | 0.41 | ◯ |
| E3 | | | 70 | 5 | 300 | 2 | 0.3 | 0.43 | ◯ |
| **CE1 | | | 300 | 7 | — | — | 0.6 | 0.38 | ◯ |
| CE2 | | | 50 | 7 | — | — | 0.2 | 0.81 | x |

*Example,
**Comparative Example

Referring to the results of the experiment, the internal haze of the optical film including a single kind of colloidal silica having an average particle size of 300 nm of Comparative Example 1 is high, on the level of 0.6%, and is thus difficult to use as a protective film of a polarizing plate.

The optical film including a single kind of colloidal silica having an average particle size of 50 nm of Comparative Example 2 has a high coefficient of static friction of 0.81. Thus, wrinkles were observed during rolling-up, and after one week, wrinkles increased and anti-blocking characteristics were poor.

In the case of Examples 1 to 3, the haze of the optical films are good on the level of 0.3% or less, and the coefficients of static friction of the optical films are good on the level of 0.6 or less to result in good slippage characteristics. In addition, the anti-blocking characteristics thereof are also good.

According to the embodiments of the present invention, the acrylic film includes the functional coating layer formed on a side of the acrylic film and including at least two kinds of fine particles having different average particle sizes. Therefore, the acrylic film has good slippage characteristics, anti-blocking characteristics, and physical properties such as transparency and stretchability.

While the present invention has been shown and described in connection with the embodiments, it will be apparent to those skilled in the art that modifications and variations can be made without departing from the spirit and scope of the invention as defined by the appended claims.

What is claimed is:

1. An optical film comprising:
   an acrylic film; and
   a functional coating layer formed on at least one side of the acrylic film, the functional coating layer comprising a water-dispersible resin and at least two kinds of fine particles having different average particle sizes,
   wherein the at least two kinds of fine particles comprise first fine particles having an average particle size of 50 nm to 150 nm and second fine particles having an average particle size of 200 nm to 280 nm, and the difference between the two average particle sizes is from 50 nm to 230 nm,
   wherein the weight ratio of the first fine particles to the second fine particles is from 30/70 to 70/30,
   wherein the optical film is for a polarizing plate,
   wherein the water-dispersible resin comprises a water-dispersible polyurethane resin, a water-dispersible acrylic resin, or a combination thereof, and
   wherein the functional coating layer comprises 0.5 to 20 parts by weight of the first fine particles and the second fine particles for every 100 parts by weight of the water-dispersible resin.

2. The optical film of claim 1, wherein the first fine particles and the second fine particles are colloidal silica fine particles.

3. The optical film of claim 1, wherein the functional coating layer has a surface friction coefficient of 0.6 or less.

4. The optical film of claim 1, wherein the functional coating layer has an internal haze of 0.5% or less.

5. A polarizing plate comprising the optical film of claim 1.

6. An image display apparatus comprising the polarizing plate of claim 5.

* * * * *